(12) United States Patent
Engberg et al.

(10) Patent No.: US 7,123,802 B2
(45) Date of Patent: Oct. 17, 2006

(54) METHOD AND DEVICE FOR ARRANGING OPTICAL FIBERS

(75) Inventors: Kristian Engberg, Sollentuna (SE); William G. McGavin, Porirua (NZ); Julian M. Christie, Wellington (NZ)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 10/507,712

(22) PCT Filed: Mar. 19, 2003

(86) PCT No.: PCT/SE03/00460

§ 371 (c)(1), (2), (4) Date: Jul. 13, 2005

(87) PCT Pub. No.: WO03/093890

PCT Pub. Date: Nov. 13, 2003

(65) Prior Publication Data
US 2006/0072885 A1    Apr. 6, 2006

(30) Foreign Application Priority Data
Mar. 20, 2002    (SE) .................... 0200887

(51) Int. Cl. G02B 6/44    (2006.01)
(52) U.S. Cl. .................... 385/112; 385/114
(58) Field of Classification Search .................... None
See application file for complete search history.

(56) References Cited

U.S. PATENT DOCUMENTS

| | | | | |
|---|---|---|---|---|
| 3,505,046 A | * | 4/1970 | Phaneuf .................... | 65/410 |
| 5,155,790 A | * | 10/1992 | Hwang .................... | 385/121 |
| 5,748,820 A | * | 5/1998 | Le Marer et al. .................... | 385/76 |
| 6,744,955 B1 | * | 6/2004 | Nechitailo et al. .................... | 385/114 |

FOREIGN PATENT DOCUMENTS

| | | |
|---|---|---|
| EP | 0108590 A1 | 5/1984 |
| GB | 2167609 A | 5/1986 |
| JP | 56074205 A * | 6/1981 |
| JP | 56094307 A * | 7/1981 |

* cited by examiner

Primary Examiner—Sung Pak

(57) ABSTRACT

A piping unit and method for efficiently arranging a plurality of optical fibers in a communication system. The piping unit includes an elongate tube having a plurality of parallel longitudinal cavities extending the length of the tube. The longitudinal cavities have a circular transverse cross-section, while the tube preferably has an approximately square transverse cross-section. Each of the longitudinal cavities is sized to mount an optical fiber within the cavity extending the length of the elongate tube. The longitudinal cavities are arranged to maximize the number of optical fibers that are mounted within the cross-section of the elongate tube. In a square tube, the cavities may be mounted in rows and columns parallel to the sides of the tube.

13 Claims, 2 Drawing Sheets

METHOD AND DEVICE FOR ARRANGING OPTICAL FIBERS

FIELD OF TECHNOLOGY

The present invention concerns a method for arranging optical fibres and/or optical fibre cables by setting up a network or system of ducts for the aforementioned, as well as creating a system of optical fibres and/or optical fibre cables including optical fibre or optical fibre cable ducts, and forming a network or system of optical fibre/optical fibre cable ducts.

STATE OF THE ART

It has been known for some time that it is possible to construct ducts for optical fibres and optical fibre cables, shaped as hollow pipes with essentially circular cross-section and made of a suitable plastic material with enough space for one or several optical fibres or optical fibre cables. Several optical fibre/optical fibre cable ducts have been used as pipelines, which have been coupled together to hold and protect a number of optical fibres/optical fibre cables.

SUMMARY OF THE INVENTION

In order to simplify the handling of several optical fibres and/or optical fibre cables piping units have been shaped like rods with essentially square cross-section, containing linearly placed, parallel holes through which fibres and/or cables are to be led. Due to the rod-like shape of the piping units, several piping units can be arranged lying parallel to each other, making one uniform piping body which can hold significantly more optical fibres or optical fibre cables without gaps being formed between the different piping units, which would be the case if piping units with a circular cross-section were used. The piping units which have been joined together this way can be provided, if need be, with some protective material that will hold them together, such as water-tight metal foil or a casing made of some conductive material. The piping units arranged this way can be extruded with a suitable extrusion tip in order to create parallel holes directly in the piping units. In order to join several piping units together, creating this way a number of unbroken strings of holes for optical fibres and/or optical fibre cables, special coupling devices have been constructed with the help of which the pipelines can be simply pieced and linked together. When joining together it is important, however, that there are no sharp edges between the piping units and the coupling device. In order to provide access to piping units which have already been installed in the ground a special linking device, the so called jointing chamber, has been constructed, which can be placed directly over the piping unit. An opening made in the piping unit together with the linking device provide access to one or more holes, so that an external pipeline holding one or more optical fibre cables or optical fibres can be connected to subscribers located outside the pipeline system.

The rod-shaped piping units can also be used indoors where their quadrangular cross-section will be advantageous, for it will easily fit in with existing interior design.

The invention is described below in more detail, with the help of a preferred method of execution and with reference to the enclosed drawing sheets.

PREFERRED EMBODIMENTS

Instead of making one pipeline cable from several pipes, covering it with a protective casing, the invention proposes that an integrated micro-duct cable be made, i.e. a piping unit containing several parallel cavities. The micro-duct cable can be used for the installation of optical fibres and/or optical fibre cables, and can be produced in an extrusion process. An extruder shall then be equipped with an extrusion press which can make several cavities in pipelines during extrusion of the rod-shaped cable.

A piping unit can have a number of geometrical cross-sections, such as circular, quadrangular or triangular.

Figure 1:
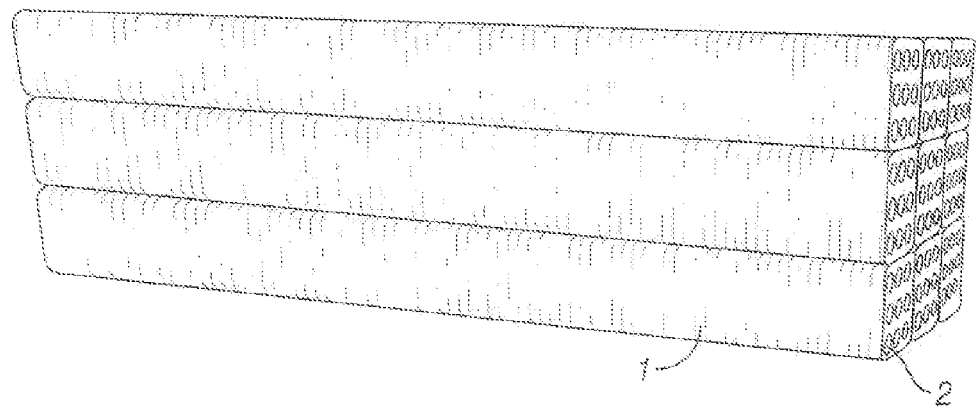
FIG. 1 shows a view in perspective of several piping units joined together and forming a piping body designed in accordance with the invention.

One proposal suggests making a micro-duct cable—a piping unit 1—containing nine cavities 2 in a cable body with an essentially square cross-section. The quadrangular shape of the piping units allows for tight packing of the units, so that when several piping units are joined together, for example, in the form of nine piping units joined together in a 3×3 configuration (see FIG. 1), a quadrangular construction of rod-shaped units containing 81 cavities is formed, measuring approximately 4×4 cm in diameter. In comparison with conventional micro-duct cables the proposed construction allows much greater density of pipeline cavities. A conventional 24 micro-duct cable has approximately the same dimensions as the proposed composite piping body which holds 81 cavities.

With the help of modern installation technology, such as mini-tracking, square geometry can be advantageous. The square shape fits into the mini-track which shall preferably have a quadrangular bottom profile. The width of the track can be reduced if the piping body with a quadrangular cross-section is used, when compared with the width of a track necessary for a cable with a circular cross-section. By applying the solution which permits a smaller track, the cost of track-making as well as filling and restoration will be reduced. The proposed piping unit can be produced in one step, as compared to conventional cables which are produced in two steps, which helps to reduce the costs of production.

Figure 2:
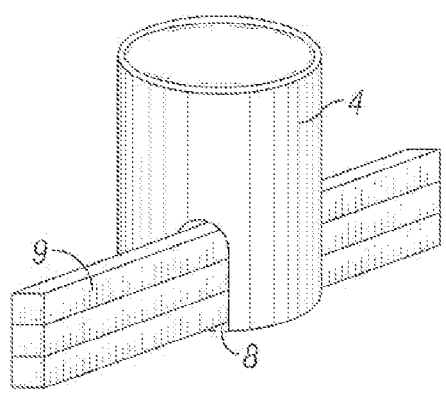
FIG. 2 shows a view in perspective of a linking device/jointing chamber used for connection of one or more pipelines to the piping unit in accordance with the invention.
Figure 3:
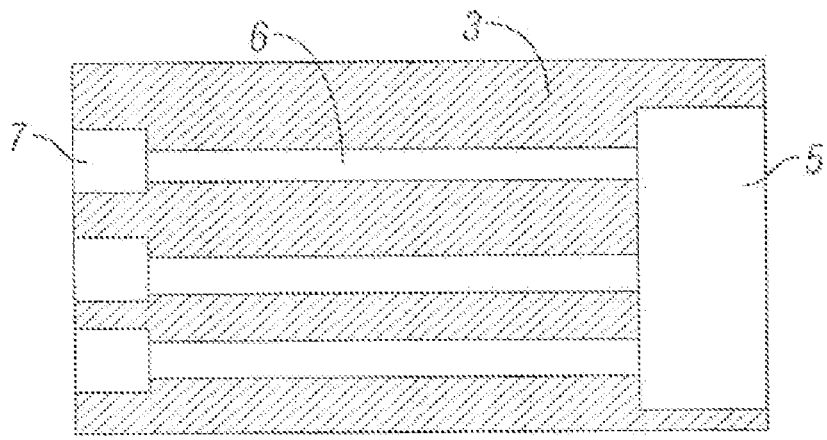
FIG. 3 shows a cross-section of a coupling device for connection of pipelines in piping units in accordance with the invention.

A coupling device 3, see FIG. 3, is used for providing access to individual micro-duct cavities in the piping units. Access to individual cavities is necessary when individual dwelling places, such as apartments, villas or offices, are to be joined together by an optical fibre system. The piping branches off in a jointing chamber 4, see FIG. 2, which is placed at a distance from the user or customer to be connected to the system, i.e. it is located in or in the vicinity of a street close to the user or customer. When this type of piping units are branched off for the purpose of access to individual micro-duct cavities, a piece of the piping unit is cut off so that its ends containing a number of micro-duct cavities are made accessible, for example, nine micro-duct cavities on each end surface. In order to gain access to each individual duct cavity a coupling device is fixed at one end of the piping unit.

An end jacket 5 is fixed on the coupling device to be placed on top of the piping unit and connected with it. The coupling device contains equivalent micro-ducts 6 characterised by the same geometry as the cavities in the piping unit. The other end of the coupling device is equipped with cavities 7 whose size is compatible with the size of conventional micro-ducts. It is now possible to branch off the individual micro-duct cavities in the piping unit by using a coupling device which permits a transition from a micro-duct cavity in a piping unit to a conventional micro-duct. It is also possible to couple a micro-duct cavity of one coupling device to another coupling device if no branching is necessary for any of the micro-duct cavities of the first piping unit.

Figure 4:
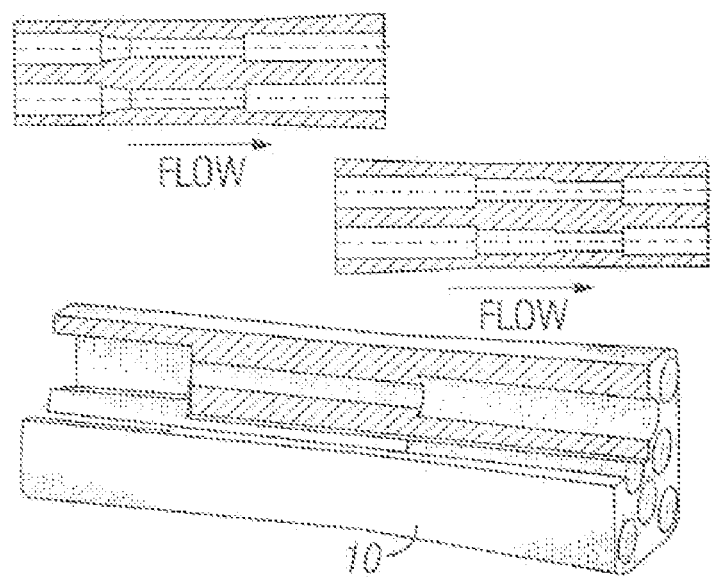
FIG. 4 shows another coupling device for connection of pipelines in piping units in accordance with the invention.

FIG. 4 shows yet another coupling device (10) for piping units with a slightly different micro-duct geometry. In this embodiment there is a possibility to supply the coupling device with a feed track in order to ensure correct positioning of the coupling device in relation to the piping unit. The figure also shows a cross-section of the direction of the movement of the optical fibre fed into the piping unit so that the optical fibre shall not get stuck at the point of connection between the coupling device and the piping unit.

As mentioned earlier, it shall be possible to branch off a piping unit in individual micro-ducts in order to connect individual users to the network. After the installation of the proposed micro-duct system the piping units are buried in the ground. In order to branch off the piping unit to link individual customers to the system a jointing chamber is installed. The proposed jointing chamber 4 has an open cylindrical body provided with two slots 8 at the bottom of the chamber. The slots go from the bottom up to about 30 cm below the edge of the jointing chamber which is covered. Thanks to the slots the jointing chamber can be installed after the installation of the piping units 9. When a jointing chamber is to be installed in the ground, the earth surrounding the piping units is usually dug out so that the jointing chamber can be lowered into the prepared hole. The piping units will go through the jointing chamber, entering and exiting through the slots. In order to facilitate the introduction of pipelines into the jointing chamber, the walls of the jointing chamber may contain weaker areas which provide easier access.

The invention is naturally not limited to the above-described methods of execution illustrated in the figures, and can be modified within the scope of the attached patent claims.

The invention claimed is:

1. A piping unit for efficiently arranging a plurality of optical fibers in a communication system, said piping unit comprising:
   an elongate tube having an approximately square transverse cross-section and having a plurality of parallel longitudinal cavities extending the length of the tube, said longitudinal cavities having a circular cross-section; and
   a coupling device mounted on an end of the elongate tube to provide access to individual optical fibers mounted within the longitudinal cavities, said coupling device including:
      a plurality of micro-ducts aligned with the longitudinal cavities at a first end of the coupling device adjacent to the end of the elongate tube; and
      a coupler for each micro-duct at a second end of the coupling device, each coupler being sized to couple with conventionally sized micro-ducts;
   wherein each of the longitudinal cavities is sized to mount within the cavity, an optical fiber extending the length of the elongate tube, and the longitudinal cavities are arranged to maximize the number of optical fibers that are mounted within the approximately square transverse cross-section of the elongate tube.

2. The piping unit of claim 1, wherein the parallel longitudinal cavities are arranged in rows parallel to upper and lower sides of the elongate tube, and in columns parallel to right and left sides of the elongate tube.

3. The piping unit of claim 1, further comprising at least one additional elongate tube mounted adjacent to and parallel to the elongate tube to increase the number of optical fibers held by the piping unit.

4. The piping unit of claim 3, wherein $X^2$ elongate tubes, where X is an integer, are mounted together to form a piping unit having an approximately square overall transverse cross-section.

5. The piping unit of claim 3, further comprising a jointing chamber for joining additional elongate tubes to the piping unit and for branching off elongate tubes from the piping unit.

6. A method of efficiently arranging a plurality of optical fibers in a communication system, said method comprising:
   providing an elongate tube having an approximately square transverse cross-section;
   forming a plurality of parallel longitudinal cavities extending the length of the tube, said longitudinal cavities having a circular cross-section, said forming step including arranging the longitudinal cavities so as to maximize the number of cavities that are formed within the approximately square transverse cross-section of the elongate tube;
   mounting within each of the longitudinal cavities, an optical fiber extending the length of the elongate tube;
   mounting a coupling device on an end of the elongate tube to provide access to individual optical fibers mounted within the longitudinal cavities, said step of mounting a coupling device including:
      aligning a plurality of micro-ducts with the longitudinal cavities at a first end of the coupling device adjacent to the end of the elongate tube; and
      mounting a coupler for each micro-duct at a second end of the coupling device, each coupler being sized to couple with conventionally sized micro-ducts.

7. The method of claim 6, wherein the step of arranging the longitudinal cavities so as to maximize the number of cavities includes arranging the parallel longitudinal cavities in rows parallel to upper and lower sides of the elongate tube, and in columns parallel to right and left sides of the elongate tube.

8. The method of claim 6, further comprising mounting at least one additional elongate tube adjacent to and parallel to the elongate tube to increase the number of optical fibers held by the piping unit.

9. The method of claim 8, further comprising joining additional elongate tubes to the piping unit utilizing a jointing chamber.

10. The method of claim 8, further comprising branching off elongate tubes from the piping unit utilizing a jointing chamber.

11. The method of claim 6, further comprising mounting a coupling device on an end of the elongate tube to provide access to individual optical fibers mounted within the longitudinal cavities.

12. A piping unit for efficiently arranging a plurality of optical fibers in a communication system, said piping unit comprising:

an elongate tube having a plurality of parallel longitudinal cavities extending the length of the tube, said longitudinal cavities having a circular cross-section, wherein each of the longitudinal cavities is sized to mount within the cavity, an optical fiber extending the length of the elongate tube, and the longitudinal cavities are arranged to maximize the number of optical fibers that are mounted within the elongate tube; and a coupling device mounted on an end of the elongate tube to provide access to individual optical fibers mounted within the longitudinal cavities, said coupling device including:

a plurality of micro-ducts aligned with the longitudinal cavities at a first end of the coupling device adjacent to the end of the elongate tube; and a coupler for each micro-duct at a second end of the coupling device, each coupler being sized to couple with conventionally sized micro-ducts.

13. The piping unit of claim 12, wherein the elongate tube has a cross-section selected from a group consisting of circular, quadrangular, and triangular.

* * * * *